INVENTORS
Rolf F. Illsley
Alfred J. Thelen
Joseph H. Apfel

Attorneys

Fig. 5
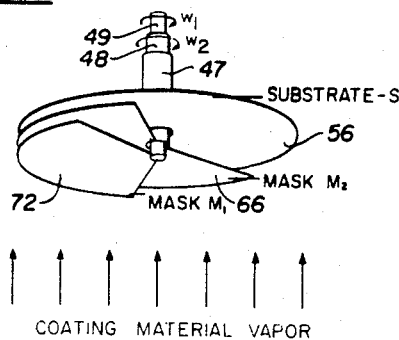
Fig. 6
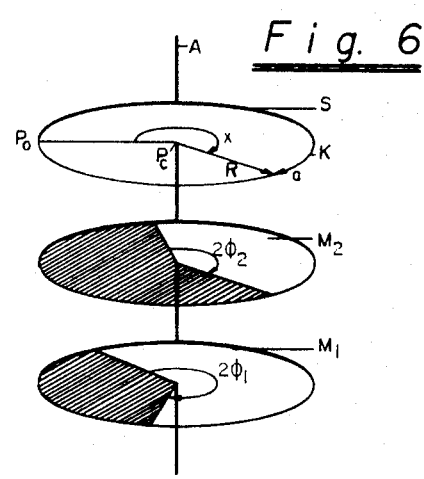
Fig. 7
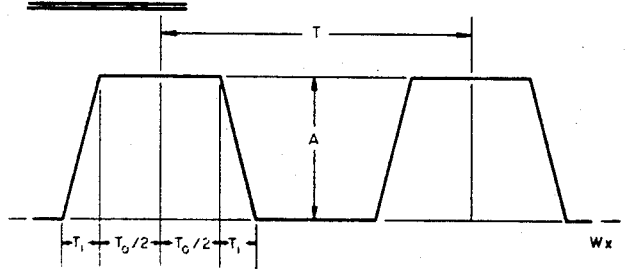
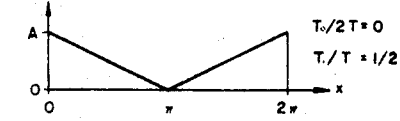
Fig. 9A
Fig. 8
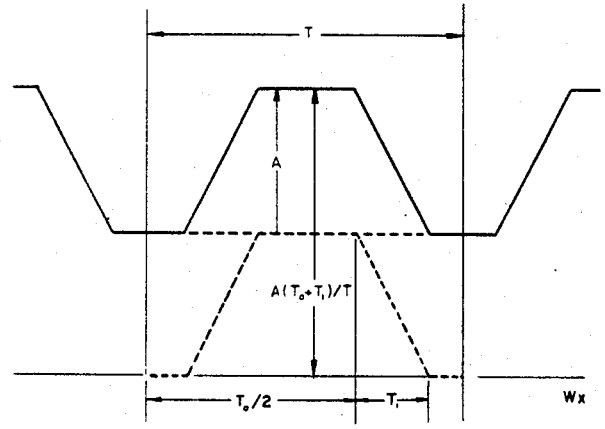
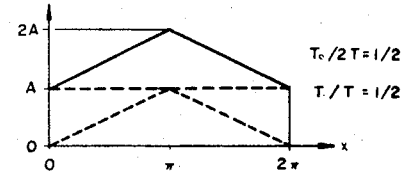
Fig. 9B

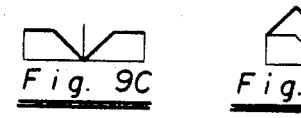
Fig. 9C  Fig. 9D
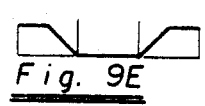 Fig. 9E  Fig. 9F
 Fig. 9G  Fig. 9H
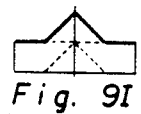 Fig. 9I 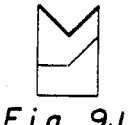 Fig. 9J
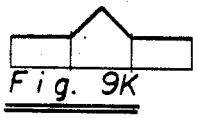 Fig. 9K  Fig. 9L
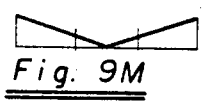 Fig. 9M  Fig. 9N
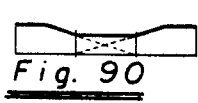 Fig. 9O  Fig. 9P
Fig. 10
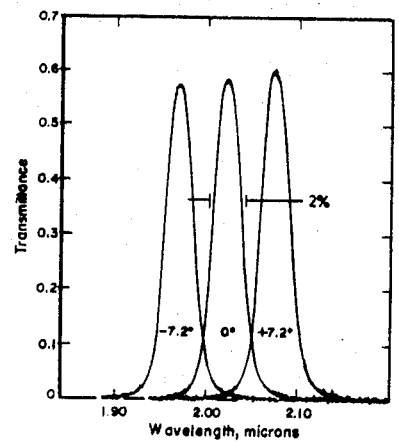
Fig. 11
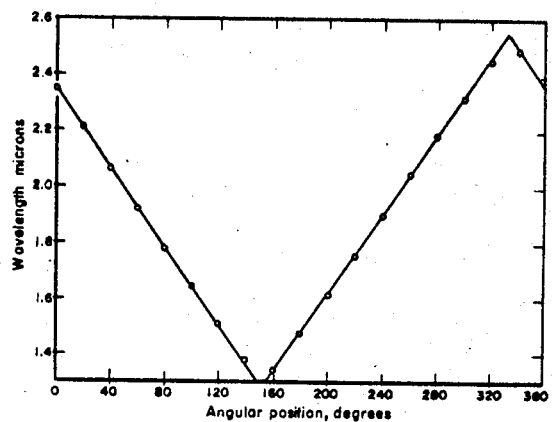
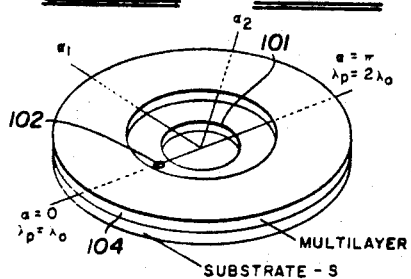
Fig. 12

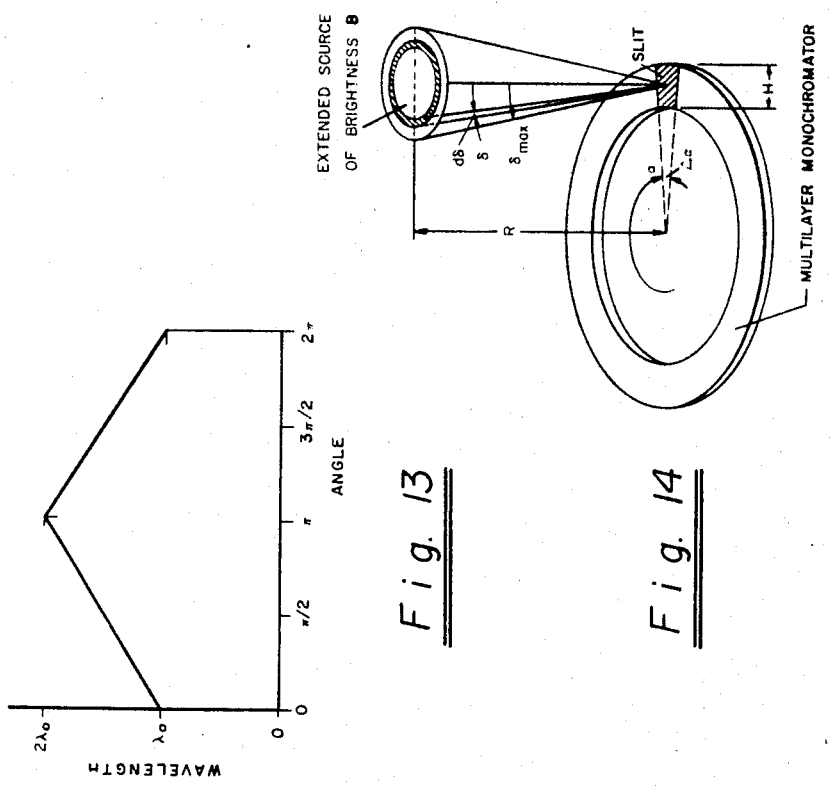

United States Patent Office 3,442,572
Patented May 6, 1969

3,442,572
CIRCULAR VARIABLE FILTER
Rolf F. Illsley, Alfred J. Thelen, and Joseph H. Apfel, Santa Rosa, Calif., assignors to Optical Coating Laboratory, Inc., Santa Rosa, Calif., a corporation of California
Filed Aug. 25, 1964, Ser. No. 391,928
Int. Cl. G02b 5/28; C23c 13/08; B41m 1/12
U.S. Cl. 350—166                              5 Claims

ABSTRACT OF THE DISCLOSURE

Circular variable filter having a multilayer interference coating with an optical thickness which changes linearly along a circle concentric with the axis of rotation.

This invention relates to a multilayer interference optical coating and assembly and the method and apparatus for manufacture of the same, and more particularly to a circular variable filter and method and apparatus for manufacture of the same.

Straight line variable filters have heretofore been manufactured and sold. However, such straight line variable filters have been limited to coatings deposited upon a rectangular substrate as the parallel lines marking a ruler which transmits light in spectral selectivity through a wavelength range as, for example, from ultra violet (approximately 400 millimicrons) to infrared (approximately 700 millimicrons). In many applications, there is a need for a circular variable filter where the lines are radial in which the transmission changes linearly through a predetermined angle of a circle and covers an unrestricted wavelength range.

In general, it is an object of the present invention to provide a multilayer interference optical coating and assembly in the form of a circular variable filter.

Another object of the invention is to provide an apparatus and method for manufacture of the circular variable filter.

Another object of the invention is to provide a circular variable filter of the above character in which the optical thickness of the coating changes linearly through a predetermined angle on the substrate.

Another object of the invention is to provide a circular variable filter of the above character in which a wide variety of filter characteristics can be readily obtained.

Another object of the invention is to provide a circular variable filter of the above character in which the variation in wavelength is linear.

Another object of the invention is to provide a circular variable filter of the above character which can be formed as different types of filters as, for example, long wavelength pass filter, short wavelength pass filter, narrow band pass filter, wide band pass filter and combinations thereof.

Another object of the invention is to provide a circular variable filter of the above character in which certain filter characteristics can be made to change linearly with the angle of the substrate over any desired wavelength range.

Another object of the invention is to provide a circular variable filter of the above character which can be utilized as a monochromator.

Another object of the invention is to provide a circular variable filter of the above character in which the optical thickness of the coating changes linearly with angle of rotation of the filter.

Another object of the invention is to provide a circular variable filter of the above character in which two filters can be deposited on separate substrates on opposite sides of the same substrate, or after proper matching on top of each other.

Another object of the invention is to provide a circular variable filter of the above character in which two filters can be adjusted so that a narrow band pass filter together with a wide band pass filter provides complete side band rejection for a wavelength ratio of better than 2:1 on both sides of the central pass band.

Another object of the invention is to provide a circular variable filter of the above character in which the resolution is not decreased appreciably under illumination with low $f$-number optics when the same is used as a monochromator.

Another object of the invention is to provide a circular variable filter of the above character in which the transmittance is a known and measurable quantity.

Another object of the invention is to provide a circular variable filter of the above character which is rotatable and in which the wavelength calibration is linear with the angle of circumferential rotation.

Another object of the invention is to provide a method and apparatus for manufacturing a circular variable filter.

Another object of the invention is to provide a method and apparatus of the above character which is relatively economical.

Another object of the invention is to provide a method and apparatus of the above character which uses sector masks rotating at different speeds.

Another object of the invention is to provide a method and apparatus of the above character in which uniformity in variation of the optical thickness of coating can be readily achieved.

Another object of the invention is to provide a method and apparatus of the above character in which the variation in optical thickness is linear.

Another object of the invention is to provide a method and apparatus of the above character in which only two rotating sector masks are required.

Additional objects and features of the invention will appear from the following description in which the preferred embodiments are set forth in detail in conjunction with the accompanying drawings.

Referring to the drawings:

FIGURE 3 is a cross-sectional view taken along the line 3—3 of FIGURE 2.

FIGURE 5 is a schematic representation of the substrate and mask arrangement similar to that shown in FIGURES 1–4 utilized for the deposition of circularly wedged coatings.

FIGURE 6 is an exploded view of the substrate S and the masks $M_1$ and $M_2$ and defines certain geometrical terms.

FIGURE 7 shows the trapezoidal waves generated by the use of the sectors shown in FIGURE 5 and gives the characteristic terms for the trapezoidal waves.

Figure 1:
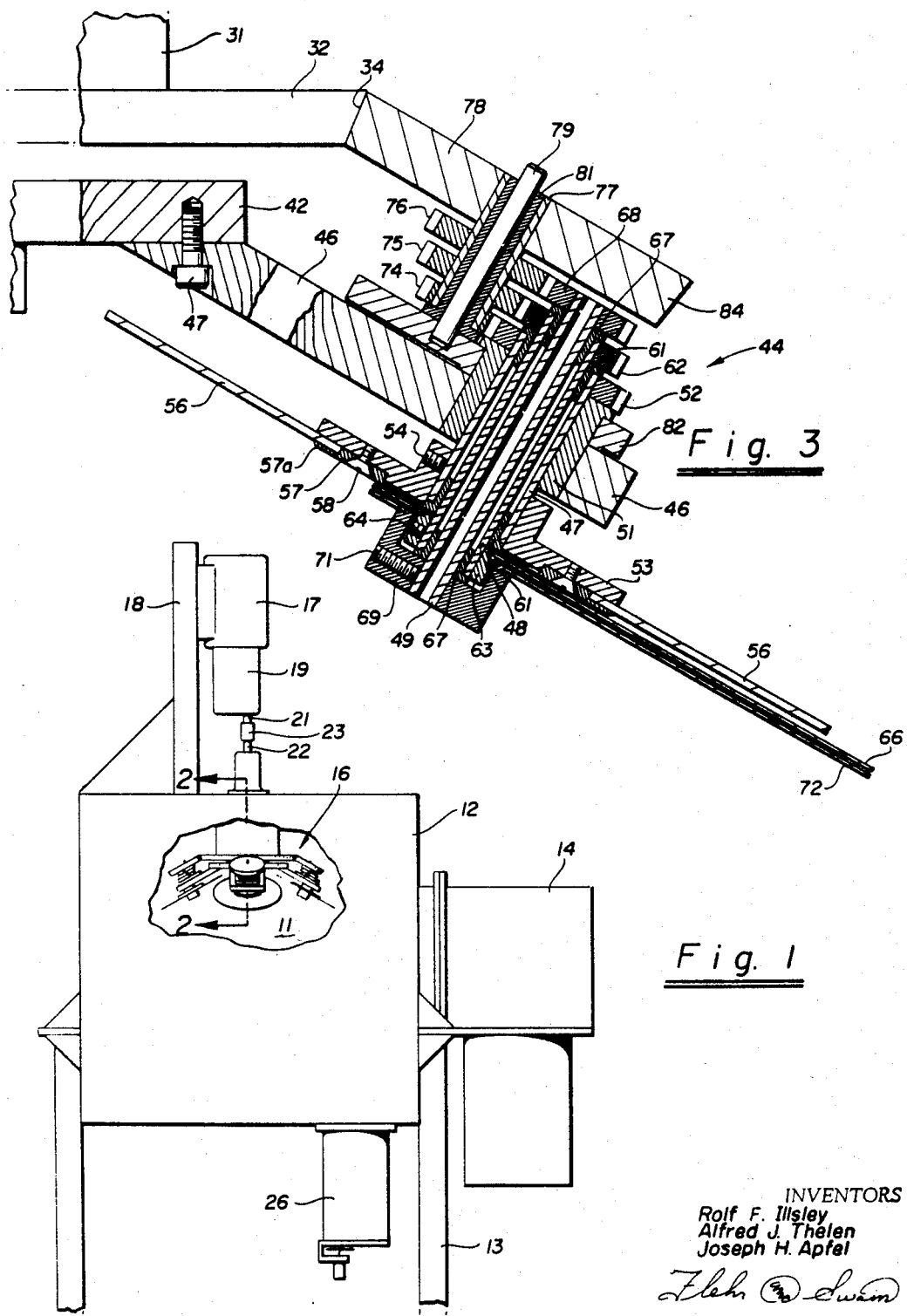
FIGURE 1 is a side elevational view with portions broken away of a vacuum coating apparatus for forming circular wedges incorporating our invention.
Figure 2:
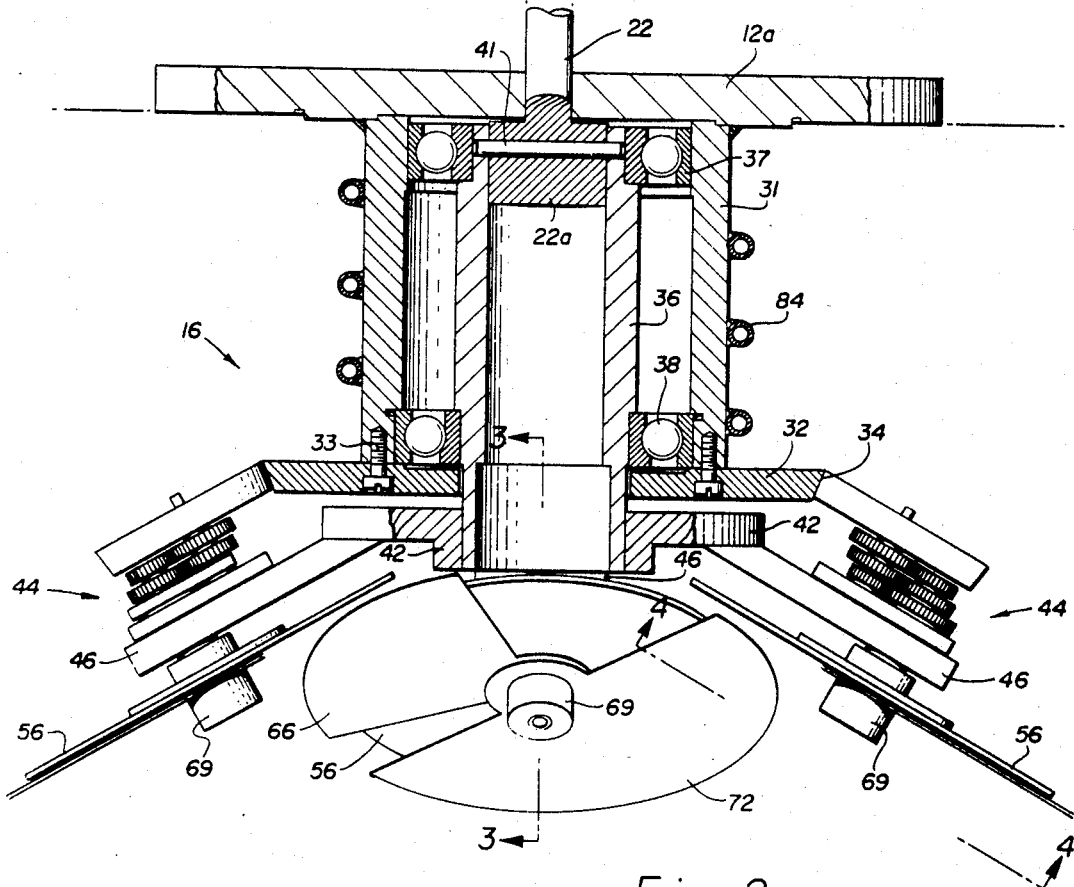
FIGURE 2 is a cross-sectional view taken along the line 2—2 of FIGURE 1.

FIGURE 8 gives an alternate shape for the trapezoidal wave shown in FIGURE 7.

FIGURES 9A–9P show a plurality of patterns of thickness distribution where the triangular wave shape is generated by superimposed trapezoidal waves.

FIGURE 10 is a graph showing the transmittance of a circular wedge filter which is constructed in accordance with the present invention.

FIGURE 11 shows the linear relationship between wavelength and angular position of a circular wedge filter constructed in accordance with the present invention.

FIGURE 12 is an isometric view of a circular wedge filter constructed in accordance with the present invention with the depth of the multilayer coating greatly exaggerated.

FIGURE 13 is a calibration chart showing the linearity of the change of thickness of the multilayer coating with change of angle on the substrate.

FIGURE 14 is a schematic illustration of a multilayer monochromator with a slit and illuminating optics.

The apparatus utilized for manufacturing our circular variable or wedge filter is shown in FIGURES 1–4 and consists of means for forming a vacuum chamber 11. The vacuum chamber is provided in a rectangular housing 12 which is provided with an access door (not shown). Suitable means is provided for placing the chamber 11 under a vacuum and, as shown, can consist of a diffusion pump 13. Means (not shown) of a conventional type is provided for mounting a plurality of sources of thermally evaporable material and for evaporating the same. In addition, means (not shown) is provided, also of a conventional type, for evaporating materials by electron bombardment.

Means is provided for carrying the circular substrates which are to be utilized for forming a part of the circular wedge filters in the vacuum chamber 11 and consists of a double rotation assembly 16 somewhat similar to the apparatus for vacuum coating disclosed in the U.S. Letters Patent 3,128,205. Means is provided for driving the double rotation assembly 16 and consists of a drive motor 17 mounted upon a support post 18 carried by the housing 12. The motor 17 drives speed reducing gearing 19 which drives an output shaft 21 which is connected to a shaft 22 of the double rotation assembly 16 by a coupling 23.

It should be pointed out that if desired, only single rotation, that is rotation about a single axis, may be used for the substrates where the sources can be centrally located and a single substrate is coated at a time.

Means is provided for monitoring the deposition of coatings upon the substrates carried by the double rotation assembly 16 and consists of an optical monitor 26 of the type described in copending application Ser. No. 321,888, filed Nov. 6, 1963.

The double rotation assembly 16 consists of a cylindrical support member 31 which is secured to the top wall 12a of the housing 12 by suitable means such as welding. A plate 32 is removably secured to the lower extremity of the cylindrical support member 31 by suitable means such as cap screws 33. The plate 32 is provided with an inclined surface 34 lying in a horizontal plane perpendicular to the support member 31. A sleeve 36 is rotatably mounted within the support member 31 and in the plate 32 by suitable means such as a pair of upper and lower ball bearing assemblies 37 and 38, each being comprised of an inner race, an outer race and a plurality of ball bearings as shown. The sleeve 36 is connected to and driven by the shaft 22 by suitable means such as a pin 41 which extends through an enlarged cylindrical portion 22a of the shaft 22 and through the upper end of the sleeve 36. A hub 42 is secured to the lower extremity of the sleeve 36.

A plurality of masking assemblies 44 are mounted upon the hub 42. In the embodiment shown in the drawing, three of the masking assemblies 44 have been provided and are positioned symmetrically about the shaft 22. Each of the masking assemblies consists of a support member 46 which is secured to the hub 42 by suitable means such as cap screws 47 which engage the support member 46 and are threaded into the hub 42. Three separate hollow shafts 47, 48 and 49 are rotatably mounted in a hub bushing 51 carried by the support member 46. The hollow shaft 47 is rotatably mounted in the bushing 51 and at one end (the upper end) has a spur gear 52 affixed thereto. A flanged hub 53 is secured to the other end (the lower end) of the hollow shaft 47 by suitable means such as a screw 54. The annular or circular substrate 56 to be coated, and which also can be identified as the substrate S, is mounted upon the flanged hub 53 by suitable means such as a ring 57. The ring 57 is removably secured to the flanged hub 53 by suitable means such as screws 58 and is provided with an annular portion 57a which is adapted to engage the inner margin of the annular substrate 56 and clamp the same to the flanged hub 53 as shown particularly in FIGURE 3 of the drawings.

A pair of bushings 61 are mounted on opposite ends of the hollow shaft 47. The hollow shaft 48 is mounted within the bushings 61 and has a spur gear 62 affixed to one end. A hub 63 is secured to the other end by suitable means such as a screw 64. A sector-shaped shielding or masking member 66, which also can be identified as mask $M_2$, is secured to the member 63. A pair of bushings 67 are mounted in the opposite ends of the hollow shaft 48. The hollow shaft 49 is rotatably mounted within the bushings 67 and carries a spur gear 68 at one end and a hub 69 at the other end. The hub 69 is affixed to the shaft 49 by suitable means such as a screw 71. A sector-shaped member 72, which also can be identified as mask $M_1$, is secured to the hub 69.

Means is provided for driving the gears 52, 62 and 68 and consists of spur gears 74, 75 and 76, respectively, which are secured to a sleeve 77 which is affixed to a drive wheel 78. The drive wheel 78 and the sleeve 77 are rotatably mounted upon a pin 79 by means of a bushing 81 which is disposed within the sleeve 77. The pin 79 is carried by a plate 82 which is secured to the bushing 51.

Means is provided for cooling the cylindrical support member 31 and consists of tubing 84 which is coiled about the cylindrical support member 31 and which is supplied with cooling fluid from a source (not shown). The drive wheel 78 is provided with an inclined surface 84 which frictionally engages the inclined surface 34 provided on the stationary plate 32.

With the arrangement shown, it can be seen that when the motor 17 is operated, the large hub 42 will be caused to rotate which will rotate the circular substrates 56 being coated about an axis which is coincident with the axis of the shaft 22 and the axis of the vacuum chamber. In addition, the substrate 56 will be rotated about its own axis by the gearing hereinbefore described at the same time it is being rotated about the axis coincident with the shaft 22 to thereby, in effect, provide the so-called double rotation system.

In the apparatus shown in FIGURES 1–4, all three elements, the substrate S and the masks $M_1$ and $M_2$, are rotated. For reasons hereinafter explained, it is only necessary that at least two of the elements be rotated during the coating of the substrate. This means that both masks $M_1$ and $M_2$ can be rotated with the substrate being stationary, or conversely, the substrate can be rotated and one of the masks held stationary. As hereinafter explained, it is only necessary that the proper rotational relationship be maintained between the elements which are rotated and the element which is held stationary. Thus, when it is desired to rotate only two of the elements for reasons of economy and simplicity, gearing for the element to be held stationary can be omitted and the element secured to the member 46.

Operation of the apparatus shown in FIGURES 1–4 for manufacturing circular wedge filters may best be understood by reference to FIGURE 5. With the arrangement shown in FIGURES 1–4 and from the schematic representation shown in FIGURE 5, two sector masks identified as masks $M_1$ and $M_2$ are placed between the substrate S and the coating source. As hereinafter explained, by proper control of the parameters, a selected variety of circularly wedged coatings can be deposited upon the substrate, the outstanding feature of which is that the coatings have a thickness which changes linearly with the angle on the substrate. Using the apparatus shown to perform the method indicated in the present invention, a collimated beam of coating material strikes the substrate and mask combination at substantially normal incidence. Coating material is deposited on the substrate whenever the path of travel for the coating material is not blocked by one or both of the two sector masks.

In order to understand how a coating can be deposited upon the substrate in which the thickness changes linearly with the angle on the substrate, a mathematical analysis as set forth below proves very helpful. Let A be defined as the common axis of rotation of the two sector masks $M_1$ and $M_2$ (see FIGURE 6). The point $P_c$ where the axis A penetrates the substrate plane S is the center of a circle K with the radius R. Thus, $a=xR$ where $a$ is the length of the arc of the circle from the point $P_0$ and where $x$ is the angle from the point $P_0$. At the time $t=0$, let it be assumed that the masks $M_1$ and $M_2$ are positioned such that the clear sectors extend from $x=-\phi_1$ to $x=+\phi_2$ for the mask $M_1$ and from $x=-\phi_2$ to $x=+\phi_2$ for the mask $M_2$.

Let it also be assumed further that whenever the path to the substrate is open, the incident coating material deposits upon the substrate at a constant rate:

$$c = \frac{dD}{dt} = \text{const.} \qquad (1)$$

where D is the thickness of the coating.

Consequently (again at $t=0$), $dD/dt$ can be expressed as a function of $x$ by the product of two square wave functions:

$$\frac{dD}{dt} = SQ(\theta_1, x) \cdot SQ(\theta_2, x) \qquad (2)$$

where.

$$SQ(\phi_n, x) = \frac{2\sqrt{c}}{\pi}\left[\frac{\theta_n}{2} + \sum_{k=1}^{\infty} \frac{\sin k\phi_n}{k}\cos kx\right] \qquad (3)$$

Since the masks are rotating at the angular speeds:

$$\frac{dx}{dt} = \text{const.} = w_1, w_2$$

at the time $t=t$ the following expression holds:

$$\frac{dD}{dt} = SQ(\phi_1, x+w_1 t) \cdot SQ(\phi_2, x+w_2 t) \qquad (4)$$

or, in detail $$\frac{dD}{dt} = \frac{4c}{\pi^2}\left[\frac{\phi_1\phi_2}{4} + \frac{\phi_1}{2}\sum_{i=1}^{\infty}\frac{\sin i\phi_2}{i}\cos(ix+iw_2 t)\right.$$

$$+ \frac{\phi_2}{2}\sum_{k=1}^{\infty}\frac{\sin k\phi_1}{k}\cos(kx+kw_1 t) \qquad (5)$$

$$\left. + \sum_{i=1}^{\infty}\sum_{k=1}^{\infty}\frac{\sin i\phi_2 \sin k\phi_1}{ik}\cos i(x+w_2 t)\cos k(x+w_1 t)\right]$$

By integrating Equation 5, the following expression can be derived for the thickness D as a function of $x$:

$$D=\int_0^t \frac{dD}{dt}dt = \frac{4c}{\pi^2}\left[\frac{\phi_1\phi_2}{4}t + \frac{\phi_1}{2}\sum_{i=1}^{\infty}\frac{\sin i\phi_2}{i^2 w_2}\sin i(x+w_2 t)\right.$$

$$+ \frac{\phi_2}{2}\sum_{k=1}^{\infty}\frac{\sin k\phi_1}{k^2 w_1}\sin k(x+w_1 t) \qquad (6)$$

$$+ \sum_{i=1}^{\infty}\sum_{k=1}^{\infty}\frac{\sin i\phi_2 \sin k\phi_1}{2ik}\left(\int_0^t \cos[(i+k)x+(iw_2+kw_1)t]dt\right.$$

$$\left.\left. + \int_0^t \cos[(i-k)x+(iw_2-kw_1)t]dt\right)\right]$$

This expression 6 contains terms which steadily increase with time and others which oscillate. If we make the assumption that we integrate over a time period long enough so that all oscillating terms can be neglected against the steadily increasing terms, a uniform thickness distribution can be derived:

$$D = \frac{c\phi_1\phi_2}{2}t \neq D(x) \qquad (7)$$

There are cases, though, when the distribution is non-uniform. This is whenever $$iw_2 \pm kw_1 = 0 \qquad (8)$$

Then the following expression for the thickness distribution results out of Equation 6:

$$D/ct = \frac{\phi_1\phi_2}{\pi^2} + \frac{2w_1}{w_2\pi^2}\sum_{k=1}^{\infty}\frac{\sin k\phi_2 \sin k\phi_1\frac{w_2}{w_1}}{k^2}\cos k\left(1-\frac{w_2}{w_1}\right)x \qquad (9)$$

This Equation 9 can be interpreted as a Fourier series of a trapezoidal wave.

The standard form of the Fourier series of a trapezoidal wave is.

$$F(Wx) = A\frac{T_0+T_1}{T}$$

$$+ 2A\frac{T}{\pi^2 T_1}\sum_{k=1}^{\infty}\frac{\sin k\frac{\pi T_1}{T}\sin k\frac{\pi(T_0+T_1)}{T}}{k^2}\cos kWx \qquad (10)$$

with the quantities T, $T_0$, $T_1$, A, and $W=2\pi/T$ as defined in FIGURE 7. Comparing Equations 9 and 10, we arrive at the following set of interrelating equations:

$$\phi_1 = \frac{w^1}{w_1}\frac{\pi(T_0+T_1)}{T} \qquad (11)$$

$$\phi_2 = \frac{\pi T_1}{T} \qquad (12)$$

$$W = 1 - \frac{w_2}{w_1} \qquad (13)$$

$$A = \frac{w_1}{w_2}\frac{\phi_2}{\pi} \qquad (14)$$

$$\frac{T_0}{2T} = \frac{w_2\phi_1 - w_1\phi_2}{2\pi w_1} \qquad (15)$$

$$\frac{T_1}{T} = \frac{\phi_2}{\pi} \qquad (16)$$

Since both $\phi_1$ and $\phi_2$ can vary from 0 to $\pi$ the quantities $T_0$ and $T_1$ can assume values which do not allow the interpretation of the series (9) by the curve shape given in FIGURE 7. Whenever $$1 \leq \frac{T_0}{2T} + \frac{T_1}{T} \leq \frac{3}{2} \qquad (17)$$

The interpretation of FIGURE 8 which is basically a trapezoidal wave with half a period out of phase and with an increased average value must be used.

Since the series derived for the thickness distribution in Equation 9 has the general form of a Fourier series for trapezoidal waves, the general statement can be made that two rotating sector masks, arranged in the described fashion, generate linear thickness distributions. It is very important to remember, though, that an assumption was made that the "exposure time" is long compared to the period T.

Particular attention must be paid to relation (13). This relation states that the periodicity of the trapezoidal wave is, in general, different from the periodicity of the substrate. For example, when $w_2/w_1 = 3$ then $W = -2$. This means that two complete cycles of the trapezoidal wave fit around one cycle on the substrate. Yet in the special case $$w_2/w_1 = 2 \quad (18)$$

one period of the trapezoidal wave falls just within one cycle on the substrate.

Of special interest are the cases when there are no regions of constant thickness or, in other words, when the trapezoidal wave simplifies into a triangular wave. This is the case when $$T_1/T = \frac{1}{2} \text{ and } 2T_0/T = 0 \quad (19)$$

or $$T_1/T = \frac{1}{2} \text{ and } 2T_0/T = 1 \quad (20)$$

FIGURES 9A and 9B give the resulting shapes. The complete specifications are given under (a) and (b) in Table I below.

TABLE I

| Case | $Z_1$ | $Z_2$ | $w_1$ | $w_2$ | $W$ | $360°-2Z_1$ (deg.) | $360°-2Z_2$ (deg.) | Average thickness | Ratio |
|---|---|---|---|---|---|---|---|---|---|
| (a) | $\pi/4$ | $\pi/2$ | 1 | 2 | 1 | 270 | 180 | $\frac{1}{8}$ | $\infty$ |
| (b) | $3\pi/4$ | $\pi/2$ | 1 | 2 | 1 | 90 | 180 | $\frac{3}{8}$ | 2 |
| (c) | $\pi/2$ | $\pi/4$ | 2 | 3 | $-\frac{1}{2}$ | 180 | 270 | $\frac{1}{8}$ | 2 |
| (d) | $3\pi/4$ | $\pi/6$ | 3 | 2 | $-\frac{1}{3}$ | 90 | 300 | $\frac{1}{8}$ | 2 |
| (e) | $3\pi/8$ | $\pi/6$ | 3 | 4 | $-\frac{1}{3}$ | 225 | 300 | $\frac{1}{16}$ | 2 |
| (f) | $5\pi/8$ | $\pi/6$ | 3 | 4 | $-\frac{1}{3}$ | 135 | 300 | $\frac{5}{48}$ | 1.5 |
| (g) | $5\pi/6$ | $\pi/4$ | 2 | 3 | $-\frac{1}{2}$ | 60 | 270 | $\frac{5}{24}$ | 1.5 |
| (h) | $15/16,\pi$ | $\pi/4$ | 3 | 4 | $-\frac{1}{3}$ | 22.5 | 270 | $\frac{19}{64}$ | 1.33 |
| (i) | $3\pi/4$ | $\pi/2$ | 3 | 2 | $\frac{1}{3}$ | 90 | 180 | $\frac{3}{8}$ | 1.25 |
| (j) | $3\pi/8$ | $\pi/2$ | 3 | 4 | $-\frac{1}{3}$ | 225 | 180 | $\frac{3}{16}$ | 1.25 |
| (k) | $5\pi/8$ | $\pi/2$ | 3 | 4 | $-\frac{1}{3}$ | 135 | 180 | $\frac{5}{16}$ | 1.143 |

Cases (a) and (b) assume that relation (18) holds true. These are not the only cases which result in triangular wave shapes, though. By going to $$|W| < 1 \quad (21)$$

parts of the trapezoidal wave can be superimposed. This can be used to advantage to create a selected variety of additional triangular shapes. Case (c) to (k) of Table I are representative. FIGURES 9C to 9F show the patterns of superimpositions. The main difference between these various cases is the ratio of maximum to minimum thickness. Cases were picked which give a useful variety of thicknesses but keep $|W|$ as large as possible so that the "exposure time" can be kept as small as possible.

Of some special interest is case (e). Here the triangular wave gives the same ratio as case (c) or (d) but the average thickness is only one half the corresponding value for (c) or (d). Consequently, if one exposes the two arrangements to the same coating material stream, one can produce two thickness ranges at the same time.

The ratio set forth in Table I is the ratio between the thickest and the thinnest portions of the coating or filter.

From any one point on the substrate S the rate of deposition of the coating material as a function of time can be described as a square wave function. Thus, when a mask is rotating between a stationary substrate and the vapor coating source, nothing is deposited when the mask is closed with respect to this particular point on the substrate and then when the mask opens, the coating material is deposited at a constant rate until the mask closes again. Thus, an on-off function is generated which is identical to a square wave. A similar type of square wave is obtained with the other mask. The result of the two masks rotating is the product of the two square wave functions which, as established above, will provide a trapezoidal function which describes the thickness of the coating as a function of wavelength on the substrate. FIGURE 7 shows such a trapezoidal function.

In FIGURE 8, it can be seen that when the trapezoidal function has an undesirable flat portion, there will be a doubling up of thicknesses in certain portions so that thickness does not change with angle. For this reason, it is desirable to find the conditions where the flat portions of the trapezoidal wave are zero, or in other words a triangular function is formed. This makes it possible to make maximum utilization of the surface of the circular substrate.

In FIGURES 9A–9P are shown a number of cases in which triangular wave shapes can be obtained in which thickness changes or varies as a function of angle. Thus, in the FIGURES 9C, 9E, 9G, 9I, etc., shown on the left-hand side, there is shown the pattern after one complete rotation cycle of the elements of the masking assembly; and then in FIGURES 9D, 9F, 9H, etc., shown on the right-hand side, there is shown the pattern obtained after one or more additional cycles of the elements of the masking assembly. From these figures, it can be seen that as the additional layers are superimposed one upon the other, a triangular wave always results. From all the different patterns shown in FIGURES 9A–9P, it can be seen that it is possible to obtain different sets of triangular waveforms. This is important because the ratio of peak wavelength can be changed by the different patterns. For example, in one circular wedge filter, the wavelength may change from $\lambda$ to $2\lambda$, whereas in another, it can change from $\lambda$ to $1\frac{1}{2}\lambda$.

As hereinbefore explained, the relative angular velocities specified in Table I above can be achieved by rotating any two of the three elements of a three-element system, for example, in the case of a system having relative velocities of 0:1:2 for the substrate S, mask $M_1$ and mask $M_2$, respectively, a rotating substrate system with relative velocities of 2:1:0 is completely equivalent and allows one mask to remain stationary. A three-speed system such as shown in FIGURES 1–4 where all the elements of the system are rotating with respect to the source is somewhat more desirable because of improved results which can be obtained. However, rotation of all three elements introduces a considerable degree of complexity and adds additional expense which may not be justified by the improved results. Thus, where economy is desired, one of the elements may be held stationary without unduly affecting the results obtained.

Figure 4:
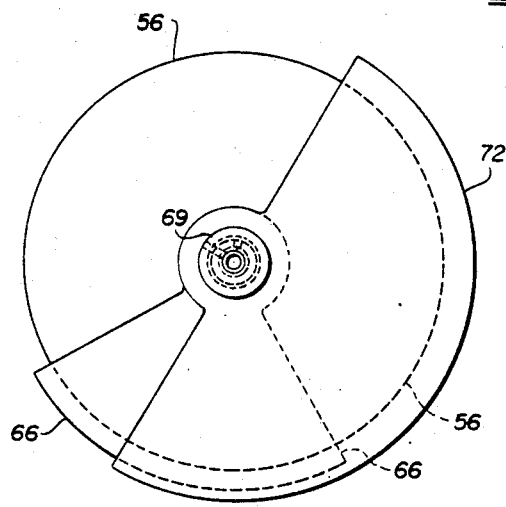
FIGURE 4 is a view looking along the line 4—4 of FIGURE 2.

By way of example, an optical circular variable filter incorporating our invention and utilizing the method and apparatus shown in FIGURES 1–4 was made in the following manner. The sector masks $M_1$ and $M_2$ utilized were 180° and 90° sector masks as shown in FIGURE 4. A relative angular velocity of the two was chosen to provide a coating having a linear thickness to angular position relationship. With such a relationship, the maximum thickness of the coating will be twice the minimum value.

The near infrared region (1–3 microns) was selected in order to optimize the parameters of simple multiple layer design, low dispersion of materials, plentiful supply of inexpensive substrate and simple coating techniques. A multilayer narrow band pass filter design of approximately 2 percent bandwidth was used. The band pass design used is described as Glass/LHLHLLHLHLHLHLLHLH/air where L and H represent one quarter of the design wavelength optically thick layers of low and high index coating materials. An example of a low index of refraction coating material is silicon monoxide which has an index of refraction of 1.9 ($n=1.9$). A representative material having a high index of refraction is germanium which has an index of refraction of 4.2 ($n=4.2$). With a filter of this design, it would be desirable to use HH spacer layers because of reduced sensitivity to angle of incidence. With germanium as the high index material and without much spacer layers, the absorption and dispersion of the germanium in the spectral region of interest would prevent attainment of the desired wedge linearity. With silicon monoxide as the low index material, there is no such problem because silicon monoxide has a very constant and reproducible index of refraction in the near infrared region.

In the formation of the variable filter which can be called a wedge filter when the variation is linear, sequential evaporation of two materials from the same source location was utilized. A glass substrate disc approximately 6 inches in diameter was positioned above the vapor source concentric with the two masks $M_1$ and $M_2$. In the particular arrangement, the 180° mask, or the mask 72 as shown in FIGURE 4, was held stationary, while the 90° mask, mask 66 in FIGURE 4, was gear driven from the main rotary motion of the substrate S at one-half of the velocity of the substrate S. The rotary motion velocity was adjusted to ensure that at least 100 sector cycles were completed during the deposition of each layer. Thus, the substrate rotated with a relative speed of two, the 90° mask rotated at a relative speed of one, and the 180° mask rotated at a relative speed of 0 or, in other words, was stationary. During the deposition of the coatings, the entire masking assembly 44 is moved rotatably around the source about the axis of shaft 22 to make it possible to achieve still greater uniformity.

In FIGURE 10, there is shown a composite transmission scan of a band pass circular wedge filter, made as outlined above, at a point 2.5 inches from the center for three different angular positions, namely $-7.2°$, $0°$ and $+7.2°$ with the $0°$ angular position being approximately half way between the extreme high and low ends. FIGURE 10 shows the transmission as a function of wavelength with the 2 percent chosen bandwidth.

In FIGURE 11, there are plotted positions of the band pass for 20° increments around the finished circular wedge filter. Thus, as shown in FIGURE 11, a plot has been obtained with angular position against peak wavelength which shows that good linearity was achieved. The very small departures from linearity are consistent with the degree of nonuniform vapor stream intensity and dispersion in the coating material.

When linearity of a circular wedge filter is being considered, in the case of a band pass filter, it is the change in the location of the center wavelength. In the case of a long wavelength band pass filter, it is the change in the half power point or the 50 percent transmission point. Other types of filters such as long wavelength pass filters, short wavelength pass filters, narrow band pass filters, wide band pass filters and various combinations thereof can be provided with analogous techniques.

In certain circular wedge filters, it may be desirable to change wavelength linearly up to a predetermined angle and then have it constant through another predetermined angle and then have the wavelength drop off linearly again to the starting point. Such wedge filters can also be readily manufactured with the apparatus and method disclosed herein.

A circular wedge made in accordance with the present invention is shown in FIGURE 12 and consists of a circular substrate S which is provided with a central hole 101 and an index hole 102. A multilayer coating 104 is deposited upon the substrate S. The thickness of the thin film 104 is greatly exaggerated with reference to the substrate S. However, as stated previously, the multilayer coating is deposited in such a way that the thickness changes linearly with the angle of rotation of the substrate S about its axis or in other words linearly along a line concentric with the axis of rotation. In the design shown, the thickness doubles through a half circle or in 180° and drops back to the original value around the remaining half circle.

Let it be assumed that the multilayer coating 104 deposited on the substrate S is a narrow band interference filter of the type hereinbefore described. Let it also be assumed that the wavelength of peak transmittance of such a filter changes directly with the thickness of the individual layers. If this circular wedge filter is now rotated behind a slit, a monochromator is formed which passes a wavelength $\lambda_p = \lambda_0$ at $\alpha = 0$, $\lambda_p = \lambda_1$ at $\alpha = \alpha_1$, and $\lambda_p = 2\lambda_0$ at $\alpha = \pi$, as shown in the drawing in FIGURE 12. A calibration chart of such a monochromator is shown in FIGURE 13. The wavelength of the monochromator can be related to the angle on the disc in the following manner:

$$0 \leq \alpha \leq \pi \quad \lambda_D = \lambda_0 \left(1 + \frac{\alpha}{\pi}\right) \quad (22)$$

$$\pi \leq \alpha \leq 2\pi \quad \lambda_D = \lambda_0 \left(3 - \frac{\alpha}{\pi}\right) \quad (23)$$

If the position of the pass band is measured in wave numbers rather than wavelengths, the relationship can be expressed as follows:

$$0 \leq \alpha \leq \pi \quad \nu_D = \nu_0 \frac{1}{1 + \frac{\alpha}{\pi}} \quad (24)$$

$$\pi \leq \alpha \leq 2\pi \quad \nu_D = \nu_0 \frac{1}{3 - \frac{\alpha}{\pi}} \quad (25)$$

As is well known to those skilled in the art, a monochromator is always used with illuminating optics. The type of illumination and the width of the slit have an effect on the performance of the monochromator.

In FIGURE 14, there is shown schematically the general case of a multilayer monochromator with illuminating optics. The extended source of brightness B can be a mirror or a lens. The bandwidth and transmittance of the monochromator can be readily computed for a variety of typical cases. A design for a multilayer monochromator is set forth in Table II below.

TABLE II

| Layer number | Type | Refractive index | Relative quarterwave thickness |
|---|---|---|---|
|  | Medium | 1.00 |  |
| 1 | H | 4.20 | 1.0 |
| 2 | L | 1.90 | 1.0 |
| 3 | H | 4.20 | 1.0 |
| 4 | LL | 1.90 | 2.0 |
| 5 | H | 4.20 | 1.0 |
| 6 | L | 1.90 | 1.0 |
| 7 | H | 4.20 | 1.0 |
| 8 | L | 1.90 | 1.0 |
| 9 | H | 4.20 | 1.0 |
| 10 | L | 1.90 | 1.0 |
| 11 | H | 4.20 | 1.0 |
| 12 | L | 1.90 | 1.0 |
| 13 | H | 4.20 | 1.0 |
| 14 | LL | 1.90 | 2.0 |
| 15 | H | 4.20 | 1.0 |
| 16 | L | 1.90 | 1.0 |
| 17 | H | 4.20 | 1.0 |
| 18 | L | 1.90 | 1.0 |
| 19 | H | 4.20 | 1.0 |
| 20 | L | 1.90 | 1.0 |
|  | Substrate | 1.50 |  |

A design of an infrared wide band pass interference filter is set forth in Table III below.

TABLE III

| Layer number | Type | Refractive index | Relative quarterwave thickness |
|---|---|---|---|
| | Medium | 1.00 | |
| 1 | L | 1.90 | .8772 |
| 2 | H | 4.20 | 1.692 |
| 3 | L | 1.90 | 1.754 |
| 4 | H | 4.20 | 1.672 |
| 5 | L | 1.90 | 1.686 |
| 6 | H | 4.20 | 1.653 |
| 7 | L | 1.90 | 1.653 |
| 8 | H | 4.20 | 1.653 |
| 9 | L | 1.90 | 1.610 |
| 10 | H | 4.20 | 1.653 |
| 11 | L | 1.90 | 1.653 |
| 12 | H | 4.20 | 1.653 |
| 13 | L | 1.90 | 1.653 |
| 14 | H | 4.20 | 1.706 |
| 15 | L | 1.90 | 1.618 |
| 16 | H | 4.20 | 1.965 |
| 17 | L | 1.90 | .9174 |
| 18 | H | 4.20 | .3125 |
| 19 | L | 1.90 | .6896 |
| 20 | H | 4.20 | .6711 |
| 21 | L | 1.90 | .6301 |
| 22 | H | 4.20 | .6329 |
| 23 | L | 1.90 | .6329 |
| 24 | H | 4.20 | .6329 |
| 25 | L | 1.90 | .6329 |
| 26 | H | 4.20 | .6329 |
| 27 | L | 1.90 | .6329 |
| 28 | H | 4.20 | .6329 |
| 29 | L | 1.90 | .5970 |
| 30 | H | 4.20 | .6161 |
| 31 | L | 1.90 | .6536 |
| 32 | H | 4.20 | .3155 |
| 33 | L | 1.90 | 1.815 |
| | Substrate | 1.50 | |

The bandwidth of a monochromator changes as a function of slit width and cone angle. Also, since interference filters shift with angle, the calibration curve of a multi-layer monochromator will also shift slightly when the monochromator is illuminated with different size light cones.

In general, it can be stated that our monochromator has many distinct advantages. Its performance will not be downgraded appreciably under illumination with low f-optics. Its transmittance is a known measurable quantity. It is rotatable and the wavelength calibration curve is linear with angle.

It is apparent from the foregoing that we have provided a new and improved circular wedge or circular variable filter and method and apparatus for manufacturing the same. The circular wedge filter has many unique characteristics which particularly lends itself to a number of applications as hereinbefore explained.

We claim:
1. In a rotatable variable filter forming at least a part of the circle, a substrate having a surface, and a coating disposed solely on said surface of said substrate, said coating being comprised of a plurality of layers of high and low index materials, each layer of the coating having an optical thickness varying with angle through a predetermined angle on the substrate, the optical thickness of said layers being uniform along any radial dimension of the coating.

2. A filter as in claim 1 wherein the thickness of each layer of the coating changes linearly with angle.

3. A filter as in claim 1 wherein the coating is exposed to the atmosphere.

4. In a rotatable wedge filter forming at least part of a circle, a substrate having a surface, and a coating deposited on said surface on said substrate, said coating being comprised of a plurality of non-metallic layers of high and low index materials, each layer having an optical thickness equal to substantially one quarter of the design wave length, the thickness of the coating changing linearly along circles concentric with the axis of rotation for the filter and being substantially uniform along any radial dimension of the filter.

5. A filter as in claim 4 wherein said coating is exposed to the atmosphere.

References Cited

UNITED STATES PATENTS 2,700,323  1/1955  Schröder _____ 350—166
2,761,797  9/1956  Young _____ 350—166
2,960,015  11/1960  Rodine _____ 95—1

FOREIGN PATENTS 1,314,569  12/1962  France.

PAUL R. MILLER, *Primary Examiner.*

DAVID SCHONBERG, *Assistant Examiner.*

U.S. Cl. X.R.

117—38; 118—49; 350—1